United States Patent [19]

Dörr et al.

[11] 4,029,751

[45] June 14, 1977

[54] PROCESS FOR PRODUCING SULFURIC ACID

[75] Inventors: Karl-Heinz Dörr, Mainz; Hugo Grimm, Frankfurt am Main; Waldemar Weber; Michael Tacke, both of Offenbach; Georg Schmidt, Frankfurt-Nied, all of Germany

[73] Assignee: Metallgesellschaft Aktiengesellschaft, Frankfurt am Main, Germany

[22] Filed: Dec. 29, 1975

[21] Appl. No.: 645,125

[30] Foreign Application Priority Data

May 5, 1975 Germany .................. 2519928

[52] U.S. Cl. .................. 423/522; 55/73; 423/531
[51] Int. Cl.² .................. C01B 17/76; B01D 53/00
[58] Field of Search .................. 423/522, 531–538; 55/73

[56] References Cited

UNITED STATES PATENTS

| 2,357,195 | 8/1944 | Herrmann | 423/531 |
| 2,471,072 | 5/1949 | Merrian | 423/522 |
| 2,629,651 | 2/1953 | Merrian et al. | 423/533 |
| 3,294,487 | 12/1966 | Pauling | 423/522 |
| 3,780,499 | 12/1973 | Dorr et al. | 423/532 |
| 3,788,043 | 1/1974 | Dorr et al. | 423/522 |
| 3,944,401 | 3/1976 | Dorr et al. | 423/522 |
| 3,950,493 | 4/1976 | Dorr et al. | 55/73 |

FOREIGN PATENTS OR APPLICATIONS 1,288,835  9/1972  United Kingdom ............... 423/522

*Primary Examiner*—O. R. Vertiz
*Assistant Examiner*—Cary P. Straub
*Attorney, Agent, or Firm*—Burgess, Dinklage & Sprung

[57] ABSTRACT

Sulfuric acid is produced from sulfur trioxide-containing humid gases by a process wherein the sulfur trioxide-containing humid gases are directly cooled with aqueous sulfuric acid, sulfuric acid is condensed and the gas is cooled below dew point of the sulfuric acid, and the water not required to form sulfuric acid is discharged as water vapor with the end gases.

8 Claims, 4 Drawing Figures

PROCESS FOR PRODUCING SULFURIC ACID

BACKGROUND

This invention relates to a process of producing sulfuric acid from $SO_3$-containing humid gases, in which the $SO_3$-containing humid gases are directly cooled with aqueous sulfuric acid, sulfuric acid is condensed in the gases cooled below the dew point of the sulfuric acid, and the water not required to form sulfuric acid is discharged as water vapor with the end gases.

In the so-called dry catalytic process, the $SO_2$ content of dry gases is catalytically reacted to $SO_3$, which is then absorbed in sulfuric acid. In the so-called wet catalytic process, the $SO_2$ and $H_2S$ contents of moist gases are catalytically reacted to form $SO_3$. Because the absorption of the $SO_3$ content in sulfuric acid is rendered difficult due to the formation of sulfuric acid mists, generally the sulfuric acid which is formed from the $SO_3$ and water vapor is condensed out. $SO_2$-containing humid gases are formed, e.g., as a result of the combustion of water vapors which contain $H_2S$, or of the after-burning of $H_2S$— and $SO_2$-containing exhaust gases from the Claus process, or of metallurgical processes. In the contact-process plant, the $H_2S$- and $SO_2$-containing gases having an oxygen content which is sufficient for the oxidation to $SO_3$ are reacted at suitable temperatures in contact with $V_2O_5$ catalysts and the sulfuric acid is subsequently condensed out in a condensing plant. Surplus water vapor is discharged in the exhaust gas. Other processes may also result in $SO_3$-containing humid gases from which sulfuric acid must also be condensed out.

It is known from German Patent 607,216 to cool in a first stage to 280°–300° C the $SO_3$-containing humid gas which leaves the contact process plant and then to condense out in a second stage the sulfuric acid by a cooling of the gas to about 150° C. The cooling in the first stage may be accomplished by an indirect cooling with air or by a spraying of water. The condensing stage consists of packed condensation columns. The cooling resulting in the condensation must be slow and must be performed in a time of not less than 0.5 second. The condensation columns must be correspondingly large.

German Patent 641,258 describes a process in which cooling and condensation are performed in a common stage. In a trickling tower, the gases are contacted with water or dilute sulfuric acid trickling in a countercurrent and are thus cooled from 300°–400° C. to 100° C. Sulfuric acid mists are thus formed at high rates and must be collected from the gases in a succeeding electrical gas purifier.

U.S. Pat. No. 2,199,691 describes also the cooling and condensation in a common stage, in which the gases are contacted with sulfuric acid trickling in a countercurrent. The gases are thus cooled from about 315° C to and below 110° C. The sulfuric acid is withdrawn from the trickling tower at 170°–230° C and is mixed with cooled sulfuric acid, which is at a temperature below 110° C, to produce mixed acids which are at a temperature below 130° C. The mixed acids are cooled below 110° C in a cooler, one partial stream of said cooled acid is fed to the mixing step and another partial stream to the top of the trickling tower. This process has the disadvantages that the gases must be indirectly cooled at high expense before entering the condenser and that the entire heat supplied to the acid during the cooling and condensing steps must be dissipated by an indirect cooling of the acid.

British Patent 692,109 describes a common cooling and condensing stage, in which the hot gas is quenched in an ejector to a temperature of about 60° C by a contact with cold sulfuric acid at about 20° C. The resulting sulfuric acid mists must be precipitated in an electrostatic precipitator, the entire heat supplied to the acid must be dissipated by an indirect cooling at high expense, and highly concentrated acid cannnot be produced if the gas has a high water vapor content.

It is known from Opened German Specification 1,792,577 to convert the $SO_2$ content in the exhaust gases from steam boiler plants to $SO_3$ by a catalytic reaction, then to cool the $SO_3$-containing gas to temperatures of 200°–140° C by an indirect heat exchange, and to collect the resulting sulfuric acid mists in a Cottrell collector at the same temperature. The practice involves a high risk of a formation of condensate during the cooling in the indirect heat exchangers and difficulties regarding the collection of the mists.

It is known from Printed German Application 1,467,157 first to cool the gases from about 275° C to 245° C in a concentrating unit, in which the gases are contacted with counter-flowing 80% sulfuric acid which trickles at a low rate and is at about 160° C, and then to cool in a second stage the gases with counter-flowing sulfuric acid which has a concentration of about 80% and trickles at a high rate and cools the gases sufficiently for a conndensation of the sulfuric acid out of the gases. The first stage results in an acid of 94% which is at 250° C. In this process, hot sulfuric acid must be recycled by pumps and the gases must be indirectly cooled at high expense before they enter.

SUMMARY

This invention avoids the disadvantages of the known processes and particularly enables a removal of the $SO_3$ content to a high degree and at minimum operating expenses and structural expenditure even where gases having a very low $SO_3$ content and gases having a high water vapor content are involved, and a formation of a more highly concentrated acid which contains, e.g., 70–95% by weight $H_2SO_4$.

This is accomplished according to the invention in that sulfuric acid of 70–95% by weight is added to cocurrently flowing, $SO_3$-containing humid gases so that the latter are directly cooled to 120°–230° C, a major part of the sulfuric acid is collected in a sump, a partial stream of the collected sulfuric acid is indirectly cooled and then recycled to the $SO_3$-containing gases, the other part of the sulfuric acid is discharged as product acid, cold air is admixed to the cooled gases, the gas-air mixture is subsequently treated with dilute sulfuric acid of 5–70% by weight, the dilute sulfuric acid is collected and further diluted by an addition of water, a partial stream of the further diluted sulfuric acid is recycled to the gas-air mixture, the other part of further diluted sulfuric acid is added to the recycled acid of 70–95% by weight, the rates at which air and water are added are controlled so that the exhaust gas which has been treated with the dilute sulfuric acid has a temperature which is harmless for the succeeding units, the treatment with the dilute sulfuric acid results in an evaporation of water substantially at the rate at which it is added, and the acid mists are collected from the exhaust gas in a mist collector.

DESCRIPTION OF THE DRAWINGS

The present invention will be more fully understood from the following description taken in conjunction with the accompanying drawing wherein.

DESCRIPTION

Figure 1:
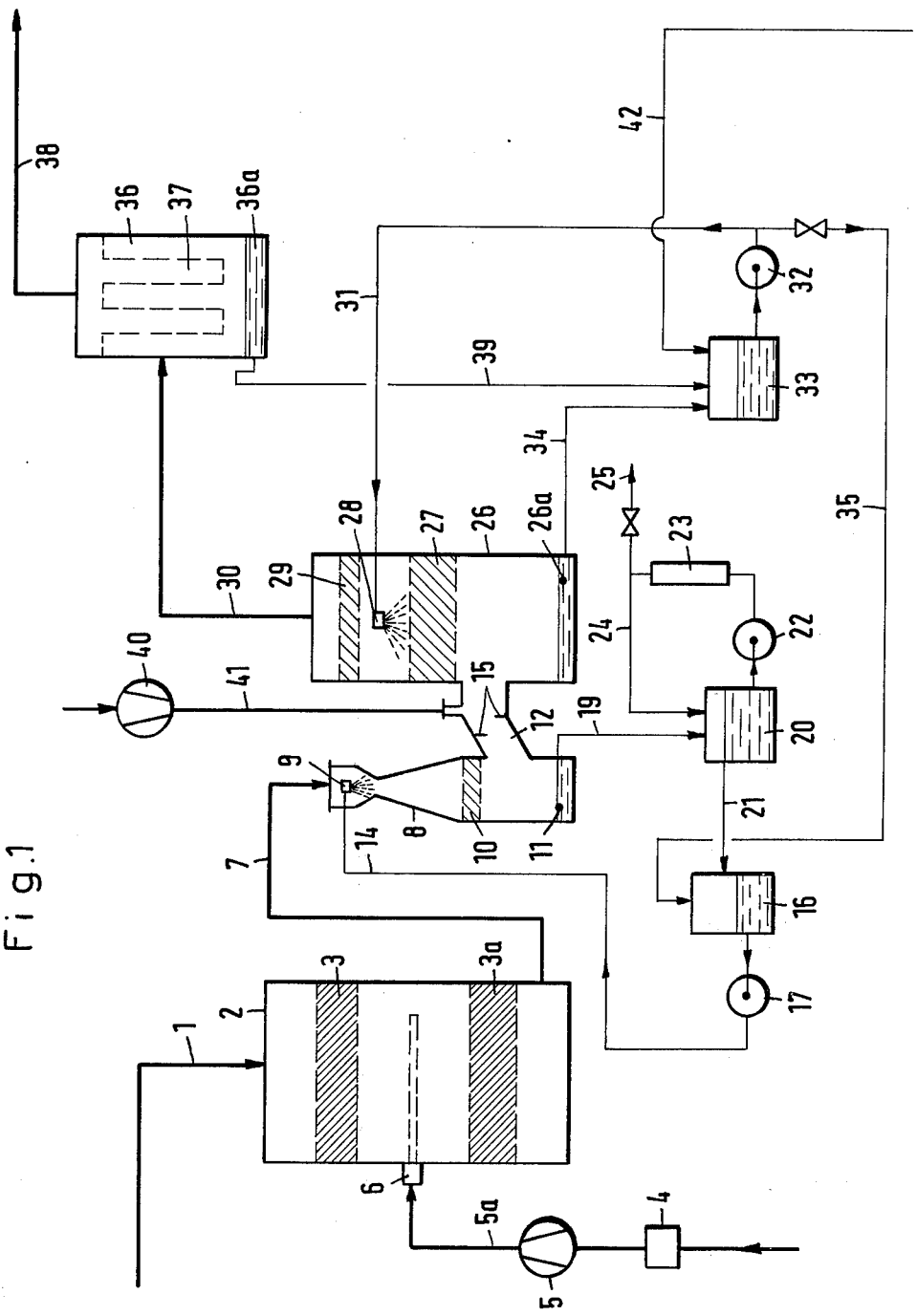
FIG. 1 is a schematic flow diagram for carrying out the process of the invention in accordance with Example 1 herein.
Figure 2:
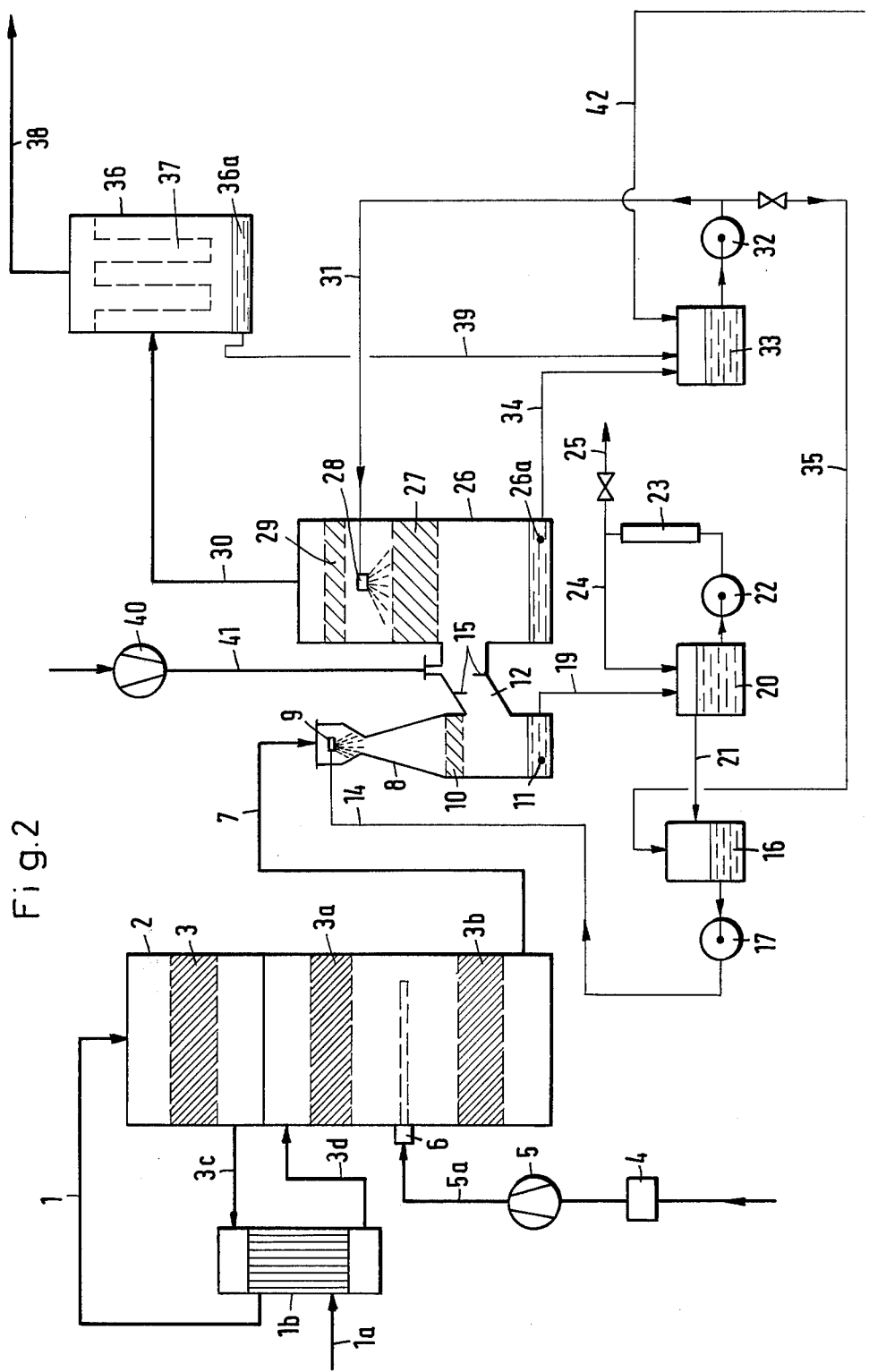
FIG. 2 is a schematic flow diagram of an alternate embodiment for carrying out the process of the invention in accordance with Example 2 herein.
Figure 3:
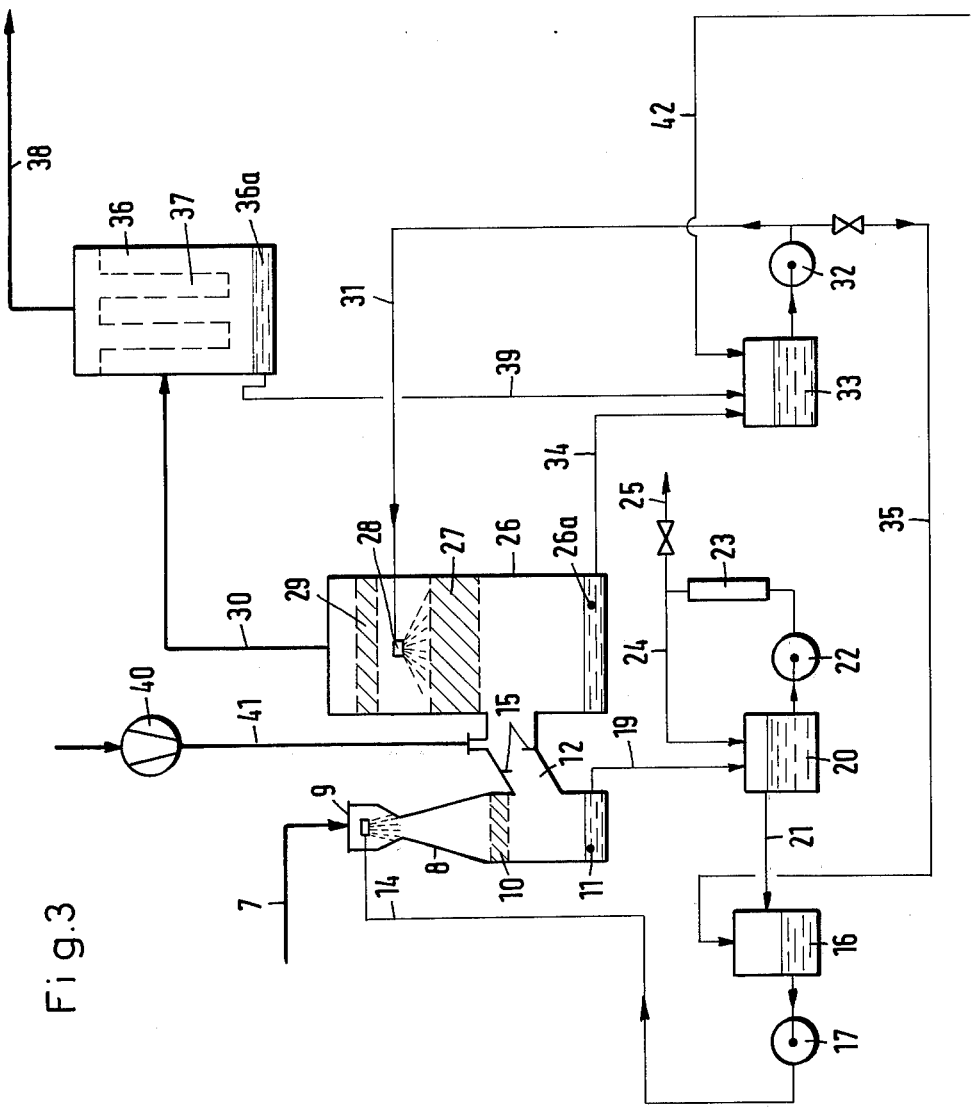
FIG. 3 is a schematic flow diagram of an alternate embodiment for carrying out the process of the invention in accordance with Example 3 herein.
Figure 4:
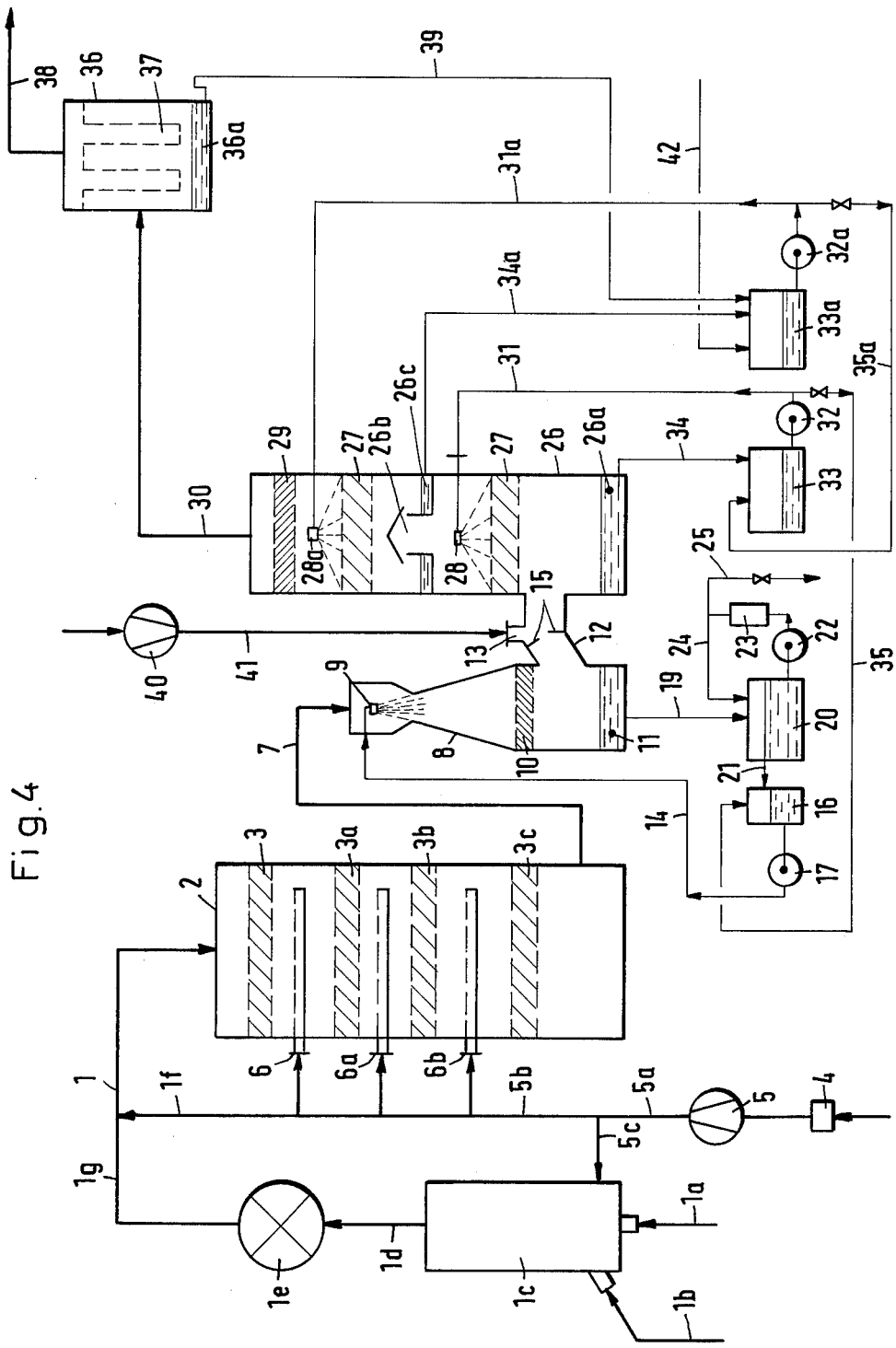
FIG. 4 is a schematic flow diagram of an alternate embodiment for carrying out the process of the invention in accordance with Example 4 herein.

The $SO_3$ content of the humid gases may be very low, e.g., about 0.3%, but it may also have any desired higher value, e.g., 8%.

The sulfuric acid of 70–95% by weight be cocurrently injected or sprayed into the $SO_3$-containing gases, which become available at a temperature of about 330°–450° C. The treatment may be performed in a Venturi tube, a packed tower, a tower having a relatively thin packed bed, or an empty tower. As a result of the direct uniflow cooling to 120°–130° C, most of the sulfuric acid formed by the $SO_3$ and water vapor is condensed out and together with a major part of the added sulfuric acid enters the sump. The acid from the sump is suitably fed through a receiver and an indirect acid cooler. Part of the cooled acid is branched off as product acid, and the remainder is returned to the receiver. This will reduce the temperature of the acid in the receiver so that the pump and the cooler are operated under less severe conditions. The acid flows from the receiver into an intermediate container, in which the acid is mixed with the branched off part of dilute acid. The mixture is then recycled by a pump. The rate at which product acid is withdrawn is equal to the rate at which new sulfuric acid is formed. The concentration of the added sulfuric acid in the range of 70°–95% by weight and the cooling of the gases in the range of 120°–230° C are so adjusted that a sulfuric acid having the desired concentration becomes available in the sump. To this end, water is condensed only at the rate which is required for the formation of sulfuric acid having the desired concentration.

The air which is injected increases the gas volume so that water at a higher rate can enter as water vapor into the gas-air mixture. As a result, the hot gas-air mixture can be cooled further by evaporative cooling. The rate at which air is added, the concentration of the recycled dilute acid, and the rate at which water is added to the dilute acid are selected so that the evaporation of the water results in the desired temperature of the exhaust gas and the added water is substantially evaporated at this temperature.

The condensation and formation of the sulfuric acid from the gas result mainly from the cooling with the acid of 70–95% by weight. Additionally a little amount of sulfuric acid is formed as a result of the treatment with the dilute sulfuric acid.

According to a preferred feature, the gas-air mixture is treated in a first stage with dilute sulfuric acid of 40–70% by weight and is then treated in a second stage with dilute sulfuric acid of 5–40% by weight and collected dilute sulfuric acid from the second-stage cycle is fed into the first-stage cycle. For this reason, the acid of 70–95% by weight can be used for cooling to a lower temperature so that the condensation and formation of sulfuric acid are promoted.

According to a preferred feature, acid collected as a result of the collection of mist is entered into the last-stage cycle of the dilute sulfuric acid. In this way, the water content of this acid is utilized for the evaporative cooling.

According to a preferred feature, a Venturi tube is used for the direct cooling of the $SO_3$-containing gases with sulfuric acid of 70–95% by weight. The cooling in a Venturi tube can be carried out in equipment of small size and with relatively low operating expenses.

According to a preferred feature, air is admixed in a transfer conduit, which constitutes a spray collector and connects the means for the direct cooling sulfuric acid of 70–95% by weight to the means for the treatment with the dilute sulfuric acid. In this case, a thorough mixing is accomplished with a low expenditure and there will no problems relating to a condensation during the admixing.

According to a preferred feature, the treatment with the dilute sulfuric acid is a counterflow operation. This results in a thorough mixing and in a condensation and formation of the remaining acid in the gas mixture at a high rate.

According to a preferred feature, the recycled partial stream of the collected dilute sulfuric acid is conducted at least in part through an indirect cooler. In this way, the temperature can be lowered at a relatively low expenditure if air is to be admixed at a lower rate.

According to a preferred feature, the exhaust gas resulting from the treatment with the dilute sulfuric acid is at a temperature of 70°–85° C. This temperature is particularly desirable because it enables an operation of the succeeding units under severe conditions and reduces the cooling expenditure.

The invention will be explained more fully and by way of example with reference to the Examples and drawings.

EXAMPLE 1 (FIG. 1)

At a rate of 10,000 standard m³/h, $SO_2$- and $H_2S$-containing containing humid gases which are at a temperature of 450° C are fed through conduit 1 into a contact-process vessel 2. The gases are composed of:

0.55% by volume $SO_2$ (55 standard m³/h)
0.65% by volume $H_2S$ (65 standard m³/h)
4.10% by volume $CO_2$ (410 standard m³/h)
4.50% by volume $O_2$ (450 standard m³/h)
58.40% by volume $N_2$ (5840 standard m³/h)
31.80% by volume $H_2O$ (3180 standard m³/h).

In two contacting trays 3 and 3a, the gases are contacted with vanadium catalysts so that the $H_2S$ content is burnt to $SO_2$ and all $SO_2$ is reacted to $SO_3$. Between the contacting trays 3 and 3a, the reaction gas is cooled with air supplied at a rate of 2620 standard m³/h. The air is sucked through an air filter 4 and by a blower 5 is blown through conduit 5a into a mixture 6 to enter the contact-process vessel 2 at a temperature of about 30° C. $SO_3$-containing gases at a temperature of about 405° C are fed at a rate of 12620 standard m³/h through conduit 7 into a Venturi tube 8, in which the gas is directly cooled and most of the $SO_3$ contained in the gas is simultaneously condensed to $H_2SO_4$. $H_2SO_4$ having a concentration of 85% by weight and a temperature of about 85° C is fed by a pump 17 through conduit 14 and injected at a rate of 12 m³/h through nozzle 9 to flow cocurrently with the gases. A packed bed 10 promotes the cooling and condensation. A major part of the injected sulfuric acid is collected in sump 11. The gas is discharged at 190° C from the Venturi tube 8 through a gas conduit 12, which is designed as a spray collector and contains baffles 15. A fan 40 delivers air at a temperature of about 30° C through conduit 41 and fitting 13 at a rate of about 2500 standard m³/h into a gas conduit 12, in which said air is admixed to the main gas stream so that the gases are cooled to about 140° C. The remaining $SO_3$ contained in the gas is condensed in a trickling tower 26, which contains a packed bed 27. $H_2SO_4$ of 40% by weight is delivered by a pump 32 at a rate of 12 m³/h through conduit 31 and injected into the tower 26 through nozzle 28. The acid is collected in a tower sump 26a. The gas is cooled to 75° C by an evaporation of $H_2O$. The $H_2O$ required for cooling is fed into the acid cycle through conduit 42. The gas-air mixture which is laden with the surplus $H_2O$ vapor and with acid mists leaves the cooling and condensing means 8, 26 through an acid spray collector 29 and a conduit 30. Sulfuric acid mist is collected in a mist collector 36, which is provided with filter candles 37. The exhaust gases from which most of the $SO_3$ and sulfuric acid mists have been removed leave the plant through conduit 38. The liquid retained in the filter chandles 37 is collected in a sump 36a and is fed through conduit 39 into a receiver 33 in the dilute acid cycle associated with the trickling tower 26. At about 180° C the strong acid, which as a concentration of 85% by weight $H_2SO_4$ leaves a Venturi tube sump 11 through conduit 19 and enters a receiver 20. About 50 m³/h acid are delivered by a pump 22 to a cooler 23 and are cooled therein from about 85° C to 60° C. About 49,5 m³/h acid are returned through conduit 24 to the receiver 20. Produce acid having a concentration of 85% by weight $H_2SO_4$ and a temperature of 60° C is discharged at a rate of about 0.5 m³/h. The acid cooled to about 85° C is drained through conduit 21 to a mixing receiver 16, which is fed with dilute acid through conduit 35.

EXAMPLE 2 (FIG. 2)

At a rate of 10,000 standard m³/h, $SO_2$- and $H_2S$-containing containing humid gases at about 360° C are fed through conduit 1a to a heat exchanger 1b and are preheated therein to 450° C and then fed through conduit 1 into a contact-process vessel 2. These gases are composed of:

0.30% by volume $SO_2$ (30 standard m³/h)
0.75% by volume $H_2S$ (75 standard m³/h)
0.15% by volume COS (15 standard m³/h)
3.95% by volume $CO_2$ (395 standard m³/h)
4.6% by volume $O_2$ (460 standard m³/h)
58.55% by volume $N_2$ (5855 standard m³/h)
31.70% by volume $H_2O$ (3170 standard m³/h).

In three contacting trays 3, 3a, 3b, the gases are contacted with vanadium catalysts so that the $H_2S$ content is burnt to $SO_2$ and all $SO_2$ is reacted to $SO_3$. The prereacted gases are fed through conduit 3c into a heat exchanger 1b and are cooled therein to about 440° C and then fed through conduit 3d to the contacting tray 3a. Between the contacting trays 3a and 3b, the gases are cooled with air, which flows at a rate of 800 standard m³/h through an air filter 4 and is delivered by a blower 5 through a conduit 5a into a mixer 6 to enter the contact-process vessel 2 at a temperature of about 30° C.

At about 405° C, the $SO_3$-containing gases are fed through conduit 7 into a cooling and condensing plant 8, 26, in which $SO_3$ is processed to form 85% sulfuric acid as described in Example 1.

EXAMPLE 3 (FIG. 3)

$SO_3$-containing humid gases at about 400° C are fed at a rate of 10,000 standard m³/h through conduit 7 into a cooling and condensing plant 8, 26. The gases are composed of:

1.73% by volume $SO_3$ (173 standard m³/h)
0.12% by volume $SO_2$ (12 standard m³/h)
3.86% by volume $CO_2$ (386 standard m³/h)
11.23% by volume $O_2$ (1123 standard m³/h)
61.36% by volume $N_2$ (6136 standard m³/h)
21.70% by volume $H_2O$ (2170 standard m³/h).

In the cooling and condensing plant 8, 26, the $SO_3$ is processed to form 85% sulfuric acid as described in Example 1.

EXAMPLE 4 (FIG. 4)

A combustion furnace 1c is fed with 435 kg/h liquid sulfur through conduit 1a and with 463 kg/h $H_2S$ through conduit 1b. These reactants are burnt with about 7175 standard m³/h air, which is admixed through conduit 5a. The combustion gases flow through conduit 1d into a waste-heat boiler 1e, in which they are cooled to about 600° C. The gases leave the waste-heat boiler through conduit 1g. 2225 standard m³/h air are admixed through 1f to reduce the temperature to 450° C.

At a rate of about 10,000 standard m³/h, $SO_3$—containing humid gases are fed through conduit 1 into a contact-process vessel 2. The gases are composed of:

6.0% by volume $SO_2$ (600 standard m³/h)
12.08% by volume $O_2$ (1208 standard m³/h)
75.82% by volume $N_2$ (7582 standard m³/h)
6.11% by volume $H_2O$ (611 standard m³/h).

In contacting trays 3, 3a, 3b and 3c, the gases are contacted with vanadium catalysts so that the $SO_2$ is reacted to $SO_3$. Between the contacting trays, the reaction gases are cooled with atmospheric air, which is blown in at a temperature of 30° C. Air is fed at a total rate of 6700 standard m³/h through mixers 6, 6a and 6b. The air (inclusive of the combustion and diluting air) is sucked by a blower through an air filter 4.

At a rate of 16,400 standard m³/h, $SO_3$-containing gases at about 410° C are fed through conduit 7 into a Venturi tube 8 and are directly cooled therein. At the same time, most of the $SO_3$ contained in the gas is condensed to $H_2SO_4$. About 55 m³/h $H_2SO_4$ having a concentration of 95% by weight and a temperature of about 75° C are delivered by pump 17 through conduit 14 and are injected through nozzle 9 to flow cocurrently with the gases. A packed bed 10 serves to improve the condensation. Most of the injected sulfuric acid is collected in a sump 11. At a temperature of about 170° C, the gas is discharged from the Venturi tube 8 through gas conduit 12, which consists of a spray collector and contains baffles 15. The strong acid having a concentration of 95% by weight $H_2SO_4$ and a temperature of about 170° C leaves a Venturi tube sump 11 through conduit 19 and is fed into a receiver 20. A pump 22 delivers about 200 m³/h acid through a cooler 23, in which the acid is cooled from about 75° C. About 198.4 m³/h acid are returned through conduit 24 into the receiver 20. About 1.6 m³/h product acid having a concentration of about 95% by weight $H_2SO_4$ and a temperature of 50° C are discharged. The acid adjusted to about 75° C drains through conduit 21 into a mixing receiver 16, which is fed through conduit 35 with about 0.47 m³/h dilute acid having a concentration of 70% by weight $H_2SO_4$. At a rate of about 1750 standard m³/h, air is about 30° C is handled by a fan 40 and flows through conduit 41 and fitting 13 into the gas conduit 12 and is admixed therein to the main gas stream so that the gases are cooled to about 155° C. The remaining $SO_3$ contained in the gas is condensed in a two-stage trickling tower 26, which contains packed beds 27 and 27a. For this purpose, 25 m³/h $H_2SO_4$ of 70% by weight are handled by a pump 32 to flow through conduit 31 and nozzle 28 and are distributed over the packed bed 27. The acid is collected in the sump 26a of the tower and drains through conduit 34 into a receiver 33. At the outlet from the first stage of the trickling tower 26, the gases are cooled to about 95° C by an evaporation of water.

The gas-air mixture leaves the first stage of the trickling tower 26 through a gas fitting 26b and enters the second stage. About 25 m³/h $H_2SO_4$ of 20% by weight are handled by a pump 32a to flow through conduit 31a and nozzle 28a and are distributed over the packed bed 27a. The acid is collected in the tower sump 26c and is drained through conduit 34a into a receiver 33a. At the outlet of the second stage of the trickling tower 26, the gas is cooled to 45° C also by an evaporation of water.

The gas-air mixture laden with the surplus $H_2O$ vapor and the acid mists leaves the cooling and condensing unit 8, 26 through a spray collector 29 and a conduit 30. The mists formed during the cooling are collected in a mist collector 36, which is provided with filter candles 37. The exhaust gases from which most of the $SO_3$ and the sulfuric acid mists have been removed leave the plant through conduit 38. The liquid retained in the filter candles 37 is collected in a sump 36a and is fed through conduit 39 into a receiver 33 included in the dilute-acid cycle associated with the trickling tower 26.

The advantages afforded by the invention resides mainly in that the condensation can be effected in a simple manner by a direct heat exchange with dilute sulfuric acid, a sulfuric acid having a relatively high concentration is produced and the formation of mists is minimized. All intermediate produces which become available can be returned into the system.

What is claimed is:

1. In the contact process for producing sulfuric acid from undried feed gases where a $SO_3$-containing humid gas is produced, said gas is directly cooled with aqueous sulfuric acid, sulfuric acid is condensed in the gases cooled below the dew point of the sulfuric acid, and the water not required to form sulfuric acid is discharged as water vapor with the end gases, the improvement which comprises
   i. adding sulfuric acid of 70–95% by weight to cocurrently flowing, $SO_3$-containing humid gases so that the latter are directly cooled to 120°–230° C;
   ii. collecting a major part of the sulfuric acid in a sump;
   iii. indirectly cooling a partial stream of the collected sulfuric acid and then recycling to the $SO_3$-containing gases;
   iv. discharging the other part of the sulfuric acid as product acid;
   v. admixing cold air to the cooled gases, subsequently treating the gas-air mixture with dilute sulfuric acid of 5–70% by weight and collecting and diluting further the dilute sulfuric acid by an addition of water;
   vi. recycling a partial stream of the further diluted sulfuric acid to the gas-air mixture while adding the other part of further diluted sulfuric acid to the recycled acid of 70–95% by weight;
   vii. controlling the rates at which air and water are added so that the exhaust gas which has been treated with the dilute sulfuric acid has a temperature which is harmless for the succeeding mist collecting units, the treatment with the dilute sulfuric acid resulting in an evaporation of water substantially at the rate at which it is added; and
   viii. collecting the acid mists from the exhaust gas in a mist collector.

2. Process of claim 1 wherein the gas-air mixture is treated in a first stage with dilute sulfuric acid of 40–70% by weight and is then treated in a second stage with dilute sulfuric acid of 5–40% by weight and collected dilute sulfuric acid from the second-stage cycle is fed into the first-stage cycle.

3. Process of claim 1 wherein acid collected as a result of the collection of mist is fed to the last-stage cycle of the dilute sulfuric acid therein using the water content of this acid for the evaporative cooling.

4. Process of claim 1 wherein a Venturi tube is used for the direct cooling of the $SO_3$-containing gases with sulfuric acid of 70–95% by weight.

5. Process of claim 1 wherein air is admixed in a transfer conduit, which constitutes a spray collector and connects the means for the direct cooling with sulfuric acid of 70–95% by weight to the means for the treatment with the dilute sulfuric acid.

6. Process of claim 1 wherein the treatment with the dilute sulfuric acid is a counterflow step.

7. Process of claim 1 wherein the recycled partial stream of the collected dilute sulfuric acid is conducted at least in part through an indirect cooler.

8. Process of claim 1 wherein the exhaust gas resulting from the treatment with the dilute sulfuric acid is at a temperature of 70°–85°.

* * * * *

UNITED STATES PATENT AND TRADEMARK OFFICE
CERTIFICATE OF CORRECTION

PATENT NO. : 4029751
DATED : June 14, 1977
INVENTOR(S) : Karl-Heinz Dorr, et al

It is certified that error appears in the above-identified patent and that said Letters Patent are hereby corrected as shown below:

Column 4, line 19, insert --with-- after "cooling".

Column 5, line 49, "10,000" should be --10.000--.

Column 6, line 15, "10,000" should be --10.000--.

Column 6, line 40, "10,000" should be --10.000--.

Column 7, line 16, "is" 1st occurrence should be --at--.

Column 7, line 56, "produces" should be --products--.

Signed and Sealed this

Twenty-seventh Day of September 1977

[SEAL]

Attest:

RUTH C. MASON
Attesting Officer

LUTRELLE F. PARKER
Acting Commissioner of Patents and Trademarks